(12) United States Patent
Basir

(10) Patent No.: US 8,417,402 B2
(45) Date of Patent: Apr. 9, 2013

(54) MONITORING OF POWER CHARGING IN VEHICLE

(75) Inventor: Otman A. Basir, Waterloo (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 659 days.

(21) Appl. No.: 12/643,377

(22) Filed: Dec. 21, 2009

(65) Prior Publication Data

US 2010/0161165 A1     Jun. 24, 2010

Related U.S. Application Data

(60) Provisional application No. 61/139,350, filed on Dec. 19, 2008.

(51) Int. Cl.
*B60L 9/00* (2006.01)
(52) U.S. Cl.
USPC ............................ 701/22; 180/65.21; 701/300
(58) Field of Classification Search .................... 701/22, 701/300; 180/65.21, 65.265; 705/14.1
See application file for complete search history.

(56) References Cited

U.S. PATENT DOCUMENTS

| | | | |
|---|---|---|---|
| 4,532,418 A | 7/1985 | Meese et al. | |
| 5,742,914 A | 4/1998 | Hagenbuch | |
| 7,181,409 B1 | 2/2007 | Murakami et al. | |
| 2005/0178632 A1 | 8/2005 | Ross | |
| 2010/0286909 A1* | 11/2010 | Tate et al. | 701/209 |

OTHER PUBLICATIONS

International Search Report for PCT Application No. PCT/CA2009/001864, Apr. 8, 2010.

\* cited by examiner

*Primary Examiner* — Gertrude Arthur Jeanglaude
(74) *Attorney, Agent, or Firm* — Carlson, Gaskey & Olds P.C.

(57) ABSTRACT

A energy meter unit for an electric vehicle contains energy measuring circuitry, a GPS unit, a CPU, and memory. The energy meter unit is capable of detecting the amount of energy charged at a specific location and storing that information for later uses, such as with a governmental incentive program.

19 Claims, 2 Drawing Sheets

MONITORING OF POWER CHARGING IN VEHICLE

This application claims priority to U.S. Provisional Application Ser. No. 61/139,350, filed Dec. 19, 2008.

BACKGROUND OF THE INVENTION

The present provisional application relates to an apparatus and method for tracking energy charging characteristics in an electric vehicle.

Many governmental bodies are introducing incentive programs as an effort to convince people to utilize alternative fuel cars such as electric vehicles. Among these incentive programs are programs which allow people to receive a discount or other credit for electricity they use to energy their electric cars. Since electric cars can be charged at any location, and not only at designated "charging stations," it is desirable to differentiate between electric energy used for charging the vehicle and energy used for other purposes. In addition to differentiating between energy used for general purposes and energy used to charge the vehicle, it is desirable to track the energy used to charge the vehicle in order to properly benefit from the incentive systems.

Without a device capable of differentiating between energy used for charging an electric vehicle and energy used for other unrelated purposes, as well as tracking and reporting the energy used for charging, electric car owners are restricted to charging their electric car at designated charging stations in order to receive the benefits of any incentive programs.

SUMMARY OF THE INVENTION

The present invention provides a device which can track the amount of energy used to charge an electric vehicle in a specific location. The device can then associate the amount of energy charged with the location where the energy was charged, and report this information to a data collection unit. The energy used to charge the vehicle may be billed at a discounted rate to the extent it can be verified that the energy was used to charge the vehicle.

These and other features of the present invention can be best understood from the following specification and drawings, of which the following is a brief description.

DETAILED DESCRIPTION OF THE PREFERRED EMBODIMENT

Figure 1:
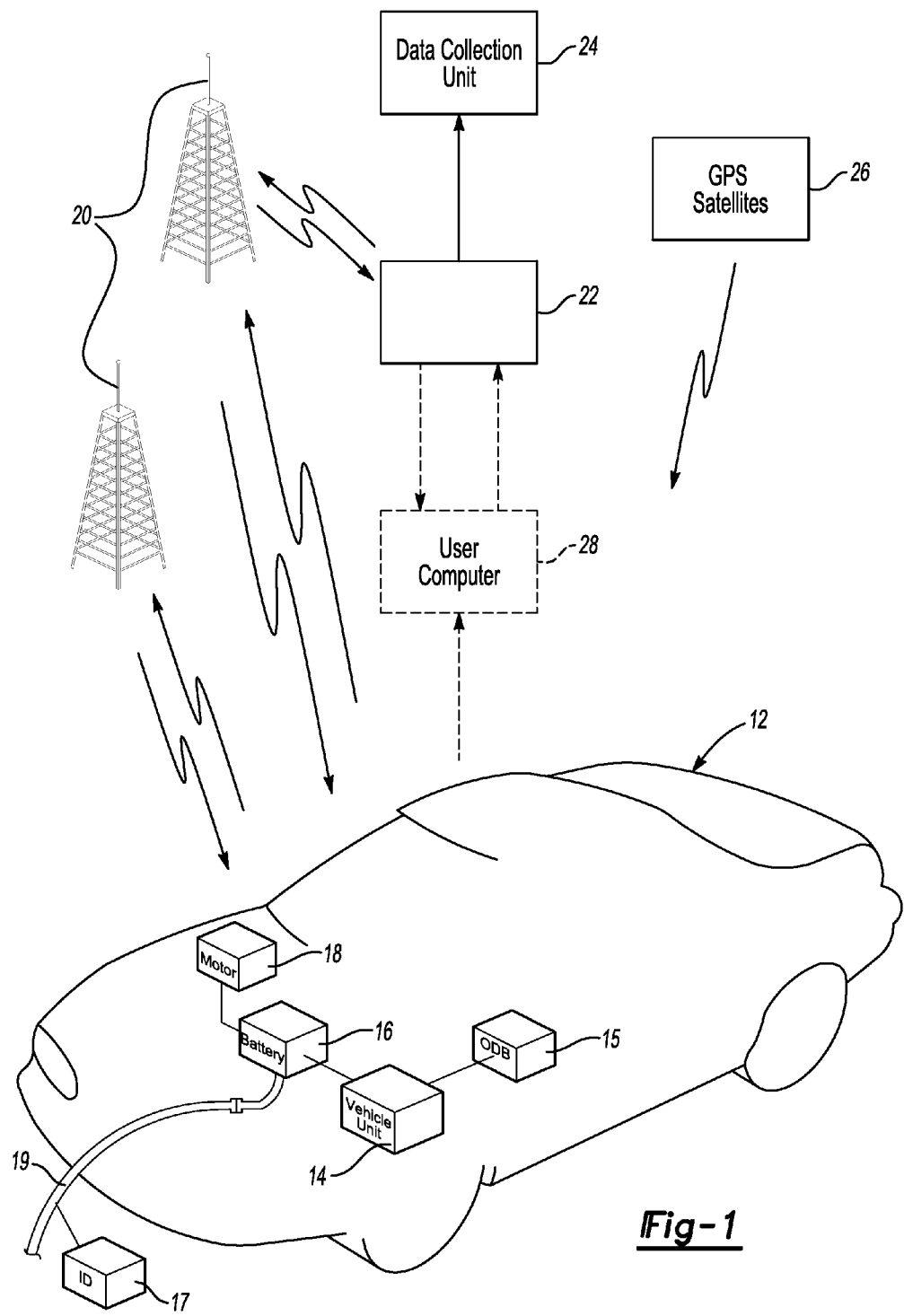
FIG. 1 illustrates a vehicle with an energy meter installed.

Referring to FIG. 1, an energy meter unit 14 for an electric vehicle 12 can be placed inside the vehicle 12. The vehicle 12 includes one or more batteries 16 for driving one or more motors 18 for driving the wheels of the vehicle 12. The energy meter unit 14 monitors energy received from a charging station or energy source 19 used to charge the battery 16. The energy source 19 could be a specialized charging station or household electrical outlet (or household 220 line). A specialized charging station may include an identification module 17, that communicates the identification (e.g. location) of the energy supplier/charging station to the energy meter unit 14. The energy meter unit 14 may connect to the vehicle 12 on-board diagnostics (OBD) port 15.

The energy meter unit 14 contains a GPS unit 38 which is capable of communicating with GPS satellites 26, thereby determining the location of the vehicle 12 at any given time. The energy meter unit 14 is also capable of communicating stored information with a data collection unit 24 (e.g. server on a wide-area network, such as the internet), either through a user computer 28 with an internet connection 22, or through another connection to the data collection unit 24, such as a wireless network 20.

Figure 2:
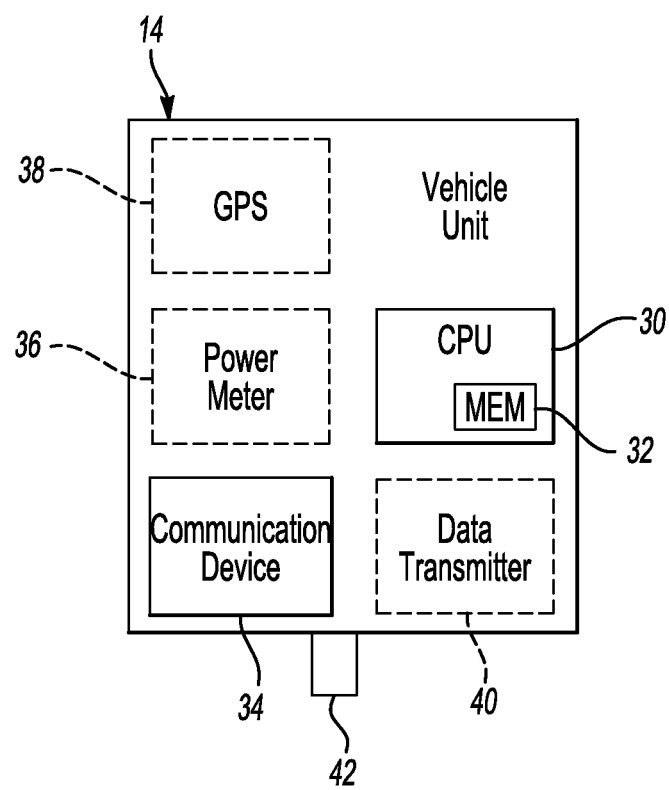
FIG. 2 illustrates an example energy meter unit.

Referring to FIG. 2, an example embodiment of the energy meter unit 14 is depicted. The energy meter unit 14 has a GPS module 38 (or other location-determining hardware, such as cell-tower triangulation, or accelerometers, speedometer, compass, and other dead-reckoning hardware and software, etc), energy measuring circuitry 36, a central processing unit 30, and a memory 32. The example of FIG. 2 can also include a connector 42 which can connect into a vehicle's data bus and a data transmission module 40.

The data transmission module 40 can be a wireless transmission device (wi-fi, 802.11, gprs, cell phone transceiver, Bluetooth, or rf transmitter, satellite communication module, or the like), removable storage media (usb, flash memory, hard drive, etc), or some other form of transferring data. It is additionally possible to include a communication device 34 which is capable of communicating with an electricity meter at an energy supply (e.g., a charging station). The communication device 34 can obtain information regarding the specific energy supplier and forward that information to the CPU 30. For example, if a user charged their car using a recharging station at 1234 Main Street, the communication device 34 would connect to a compatible device in the charging station, obtain the identifying information, and tell the CPU 30 that a recharge of a certain amount occurred at 1234 Main Street.

In the above described system, as soon as the battery 16 is connected to an energy source 19 for charging, the energy meter unit 14 measures and registers a battery's energy level. The energy meter unit 14 then monitors the energy level of the battery 16 and an amount of energy delivered by the energy source 19 throughout the charging session resulting in data representing total energy used in the charging session, energy stored in the battery, or any other desired energy statistic.

The energy meter unit 14 can also connect to the vehicle data bus (e.g. ODB 15) to determine and record any identifying information such as the vehicle identification number (VIN) of the vehicle 12. Based on this, the energy meter unit 14 and an energy point can determine that the energy supplied by the energy point was used to charge a battery 16 used by the specific vehicle 12. This can be used by the server 24 to provide the energy source 19 owner with energy credit for charging vehicle 12, and/or can be used to provide the owner of the vehicle 12 a credit for the amount of energy he bought from the energy source 19. The GPS reading can provide further evidence that vehicle 12 was charged during certain time at a specific location.

In operation, as soon as the battery 16 that is used to energy the electrical vehicle 12 is connected to an energy source 19 for charging, the energy meter unit 14 measures and registers the battery's energy level prior to charging. The energy meter unit 14 then monitors the energy level of the battery 16 and the amount of energy delivered by energy source 19 during the charging session (comparing the two allows for energy leakage measurement, and provides credit options to the server 24 as to credit for what was delivered versus for what was stored in the battery 16). The energy meter unit 14 will also contact the vehicle ODB 15 to enquire and record the vehicle identification number of the vehicle 12 that uses the battery 16 being charged. Based on this one can determine that the energy supplied by the energy source 19 was used to charge the battery 16 used by vehicle 12. This can be used by server 24 to provide the energy source 19 owner with energy credit for charging vehicle 12, and can also be used to provide the owner of the vehicle 12 a credit for the amount of energy he/she bought from the energy source 19. The GPS reading can provide further evidence that the vehicle 12 with that VIN was charged during a certain time at the GPS location. This GPS location can be used to determine an address (geocoding) and the address can be used to facilitate proper credits given to energy source 19 located at the address. Furthermore, the GPS locations (and hence the address) associated with the energy charging session can be used to validate a claim (s) by an energy source 19 associated with the address that it truly supplied a certain amount of energy to vehicle 12.

If the energy source 19 has electronic identification 17 that it can transmit to the energy meter unit 14, then this identification information is also recorded by the energy meter unit 14 and transmitted to server 24. The GPS information can also be used to track vehicle 12 driving usage, so as to enable road based energy consumption calculations and congestion/road class related incentives and credits on the server 24.

The data collection unit 24 collects from the energy meter unit 14 via one or more of the means described above (wirelessly or via a home computer). The data collection unit 24 allows the user to login to his/her account to review energy charging events using the home user computer 28. The data collection unit 24 transmits relevant usage data to appropriate government and other credit agencies. Such agencies can also access the data collection unit 24 to validate claims, and to develop aggregated usage data across multiple users and/or with respect to spatial relevant usage data, for example, how much electrical energy was consumed in a certain geographical area.

In this application, "battery" refers to one or more batteries, since a "battery" often comprises several battery units combined together. "Electric vehicle" refers to any vehicle using electricity for locomotion, whether a pure electric vehicle, hybrid, etc.

Although a preferred example has been disclosed, a worker of ordinary skill in this art would recognize that certain modifications would come within the scope of this invention. For that reason, the following claims should be studied to determine the true scope and content of this invention.

What is claimed is:

1. An energy meter for an electric vehicle comprising;
    a location-determining system for determining a current location of the vehicle;
    an energy meter for measuring a charge energy supplied to a battery on the vehicle; and
    a processor receiving the current location and measure of energy charging the battery and associating the measure of charge energy supplied to the battery with the location at which the battery was supplied with the charge energy.

2. The energy meter of claim 1 wherein said processor is capable of associating the measure of charge energy with the location based on information from a GPS receiver.

3. The energy meter of claim 1 wherein said energy meter is connected to a vehicle data bus thereby allowing the processor to obtain vehicle information and associate the vehicle information with the charge energy.

4. The energy meter of claim 1 additionally comprising a data transmission module capable of transmitting the measure and the location via at least one of a wireless communication method or a removable memory method.

5. The energy meter of claim 4 wherein said data transmission module transmits the measure and location to a data collection server.

6. The energy meter of claim 1 wherein the energy meter receives energy supplier information regarding a source of the charge energy supplied to the battery.

7. A method for tracking electric energy charging in an electric vehicle comprising the steps of;
    determining a current location of the vehicle;
    determining an amount of energy supplied to a battery on the vehicle at the current location;
    associating the amount of energy supplied with the current location.

8. The method of claim 7 additionally comprising the steps of obtaining and storing vehicle identification information specifically identifying the vehicle and associating the energy supplied with said vehicle.

9. The method of claim 7 comprising the additional step of transmitting said amount of energy supplied and said current location to a data collection server.

10. The method of claim 7 further including the steps of:
    a) determining an amount of energy sent to the battery;
    b) determining an amount of energy stored by the battery during said step a);
    c) determining an amount of energy lost based upon said steps a) and b).

11. A method for tracking energy charging in an electric vehicle including the steps of:
    receiving a measure of energy supplied to a battery of a vehicle;
    receiving a location of the vehicle at which the energy was supplied to the battery; and
    associating the measure of energy with the battery.

12. The method of claim 11 further including the step of charging for the energy supplied to the battery based upon the location at which the energy was supplied.

13. The method of claim 11 further including the step of granting a credit for the measure of energy supplied to the battery of the vehicle, wherein the credit is granted based upon the measure of energy and the location.

14. The method of claim 11 wherein a payment rate for the energy supplied to the battery is determined based upon a confirmation that the energy was supplied to the battery of the vehicle.

15. The method of claim 11 further including the step of providing a credit for the energy supplied, wherein the credit is provided to the location at which the battery was charged.

16. The method of claim 11 further including the step of receiving driving information, including locations where the vehicle is driven and determining road-based incentives, credits or charges.

17. The method of claim 7 wherein the current location of the vehicle is determined based on information from a GPS receiver.

18. The method of claim 11 wherein the location of the vehicle is determined based on information from a GPS receiver.

19. The method of claim 11 additionally comprising the steps of receiving vehicle identification information specifically identifying the vehicle and associating the energy supplied with said vehicle.

* * * * *